United States Patent
Nouard et al.

(10) Patent No.: US 9,361,286 B2
(45) Date of Patent: Jun. 7, 2016

(54) VISUAL TRACKING OF REPORT CHANGES

(75) Inventors: Arnaud Nouard, D'Huison-Longueville (FR); Ludovic Engrand, Torcy (FR)

(73) Assignee: Business Objects Software Limited, Dublin (IE)

( * ) Notice: Subject to any disclaimer, the term of this patent is extended or adjusted under 35 U.S.C. 154(b) by 848 days.

(21) Appl. No.: 13/101,166

(22) Filed: May 5, 2011

(65) Prior Publication Data

US 2012/0284617 A1    Nov. 8, 2012

(51) Int. Cl.
*G06F 17/00* (2006.01)
*G06F 17/24* (2006.01)
*G06F 17/30* (2006.01)
*G06F 17/22* (2006.01)

(52) U.S. Cl.
CPC .......... *G06F 17/246* (2013.01); *G06F 17/2288* (2013.01); *G06F 17/24* (2013.01); *G06F 17/30011* (2013.01); *G06F 17/30368* (2013.01); *G06F 17/30516* (2013.01); *G06F 17/30551* (2013.01); *G06F 17/30592* (2013.01)

(58) Field of Classification Search
CPC ............ G06F 17/246; G06F 17/30011; G06F 17/30368; G06F 17/2288; G06F 17/24; G06F 17/30516; G06F 17/30551; G06F 17/30592
USPC .......................................... 715/220, 212, 229
See application file for complete search history.

(56) References Cited

U.S. PATENT DOCUMENTS

| | | | |
|---|---|---|---|
| 2006/0080594 A1* | 4/2006 | Chavoustie et al. | 715/503 |
| 2006/0136510 A1* | 6/2006 | Voronov et al. | 707/203 |
| 2006/0143243 A1* | 6/2006 | Polo-Malouvier et al. | 707/203 |
| 2007/0150862 A1* | 6/2007 | Naibo et al. | 717/110 |
| 2008/0189440 A1* | 8/2008 | Goyal et al. | 709/248 |
| 2010/0094815 A1* | 4/2010 | Elseth et al. | 707/695 |
| 2011/0161425 A1* | 6/2011 | Xiao et al. | 709/206 |

OTHER PUBLICATIONS

Joe Bergin et al.; An overview of visualization: its use and design: report of the working group in visualization; In Proceedings of the 1st conference on Integrating technology into computer science education (ITiCSE '96); ACM, New York, NY, USA, pp. 192-200 (http://doi.acm.org/10.1145/237466.237647).

Trygve Reenskaug; Thing-model-view-editor: an example from a planning system; Technical report, Xerox PARC, USA 1979, republished as Web Document; pp. 1-11; (http://folk.uio.no/trygver/1979/mvc-1/1979-05-MVC.pdf).

Jeffrey Heer et al.; Prefuse: a toolkit for interactive information visualization; In Proceedings of the SIGCHI conference on Human factors in computing systems (CHI '05); ACM, New York, NY, USA; pp. 421-430 (http://portal.acm.org/citation.cfm?doid=1054972.1055031).

Michael Caplinger; Graphical database browsing; In Proceedings of the third ACM-SIGOIS conference on Office information systems (COGS '86); ACM, New York, NY, USA; pp. 113-121; (http://portal.acm.org/citation.cfm?doid=15433.15853).

* cited by examiner

*Primary Examiner* — Nathan Hillery (57) ABSTRACT

Various embodiments of systems and methods for visual tracking of report changes are described herein. The used technique adds transitions between all steps of modification to a report document instead of static new pages. A classification module classifies the modifications and an identification module selects a visual effect to be used as transition state according to the classified modification.

17 Claims, 6 Drawing Sheets

| Home State | Presidency | President |
|---|---|---|
| New York | 8 | Martin Van Buren |
| Tennessee | 11 | James K. Polk |
| New Hampshire | 14 | Franklin Pierce |
| Pennsylvania | 15 | James Buchanan |

510

| Home State | Presidency | President |
|---|---|---|
| New York | 8 | Martin Van Buren |
| Tennessee | 11 | James K. Polk |
| New Hampshire | 14 | Franklin Pierce |
| Pennsylvania | 15 | James Buchanan |

VISUAL TRACKING OF REPORT CHANGES

FIELD

The field relates to business intelligence (BI) reporting. More precisely, the field relates to visually tracking data changes in report documents.

BACKGROUND

BI refers to computer-based techniques used in identifying, extracting and analyzing business data, such as sales revenue by products and/or departments, or by associated costs and incomes. BI technologies provide historical, current and predictive views of business operations. Common functions of BI technologies are reporting, online analytical processing, analytics, data mining, business performance management, benchmarking, text mining, and predictive analytics. BI aims to support better business decision-making. Thus a BI system can be called a decision support system.

BI reporting is a common function used in visually presenting business data for business decision making. Typically, a report consists of data that a BI user is interested in. The data in the report is typically static, and when the BI user modifies the presented data, the updated data is presented in a new page without keeping track of the previous state of the data. Thus, by performing actions on the data such as "sort", "expand", "collapse", etc., the updated report data is typically given in a new screen without a transition state. A transition state might help the BI user in tracking what changes to the data has been done. There is a need for visually tracking the data changes in report documents.

SUMMARY

Various embodiments of systems and methods for visual tracking of report changes are described herein. In one embodiment, the method includes receiving a user interaction for modification of at least one report element in a report document and classifying the modification of the at least one report element. The method also includes identifying a visual effect based on the classified modification of the at least one report element and updating the report document by applying the identified visual effect together with the modification of the at least one report element.

In other embodiments, the system includes at least one processor for executing program code and memory, a report document, and an input device to receive user interaction for modification of at least one report element in the report document. The system also includes a classification module to classify the modification of the at least one report element and an identification module to identify a visual effect based on the classified modification of the at least one report element. The system further includes a display to show updates on the report document by applying the identified visual effect together with the modification of the at least one report element.

These and other benefits and features of embodiments of the invention will be apparent upon consideration of the following detailed description of preferred embodiments thereof, presented in connection with the following drawings.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

DETAILED DESCRIPTION

Embodiments of techniques for visual tracking of report changes are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

Figure 1:
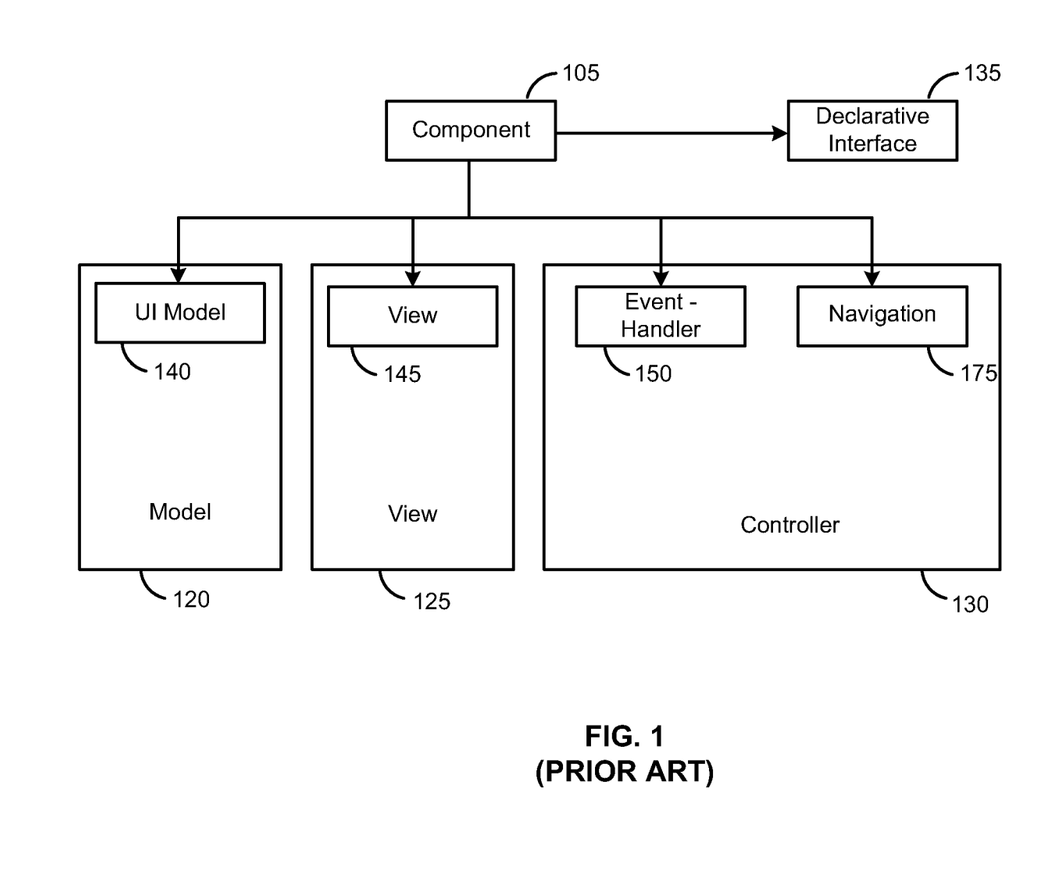
FIG. 1 is a block diagram illustrating a current technology of a model-view-controller (MVC) architecture for defining user interfaces (UIs).

FIG. 1 is a block diagram illustrating a current technology of a model-view-controller (MVC) architecture for defining user interfaces (UIs). Component 105 is a self-contained model of a user interface (UI) that can be declaratively used in another UI model. Component 105 consists mainly of a model 120, a View 125, a Controller 130, and a declarative interface 135. View 125 consists of a set of views, such as view 145, which is the description of the user interface that binds to the UI model 140 and triggers event-handlers such as event-handler 150. The UI model 140 describes a data structure, which can bind to backend business data (not shown). Controller 130 includes different types of event-handler 150 such as: business data actions, queries, etc. Business data actions include several types of actions defined and exposed through the implementation of the business data. From the UI, an operation of type "Action" such as "Sort" or "Expand/Collapse" can be used to trigger a particular action in the context of the current data instance, which again potentially can change the state and data as well. A query can be executed from an event handler operation as well. The defined query of the business data is executed and the query result data is filled into the configured data model list. Navigation 175 is the context mapping for outgoing-incoming operations. The declarative interface 135 exposes ports binding capabilities in embedded scenarios, and configuration to composite environments.

Figure 2:
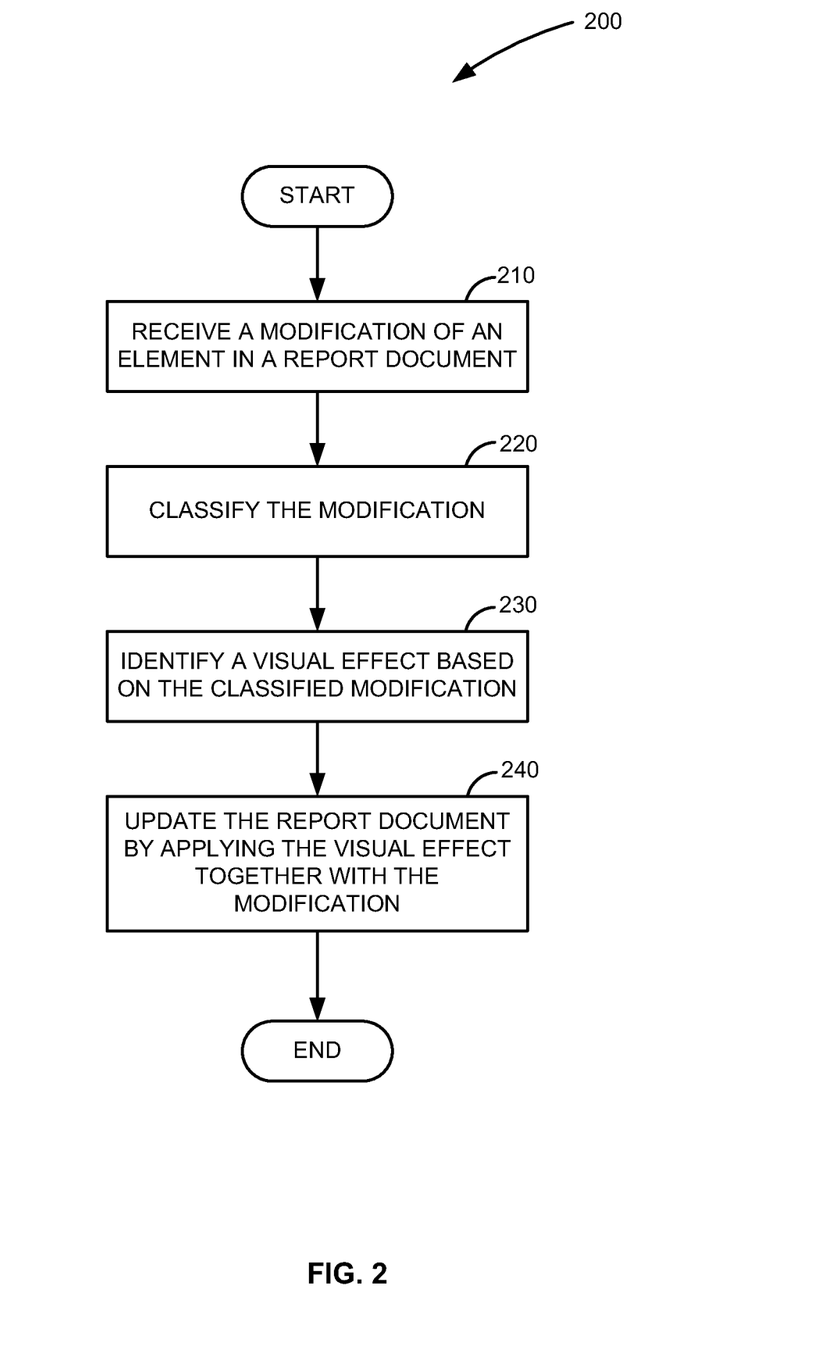
FIG. 2 is a flow diagram of an embodiment of a method for visual tracking of report changes.

FIG. 2 is a flow diagram of an embodiment of a method 200 for visual tracking of report changes. The method begins at block 210 with receiving a modification of an element in a report document. In one embodiment, the report document is presented in a user interface according to a user interface model such as model 140. In one embodiment, the modification is received by a user interaction. The interaction may be, in one embodiment, an event handler 150 such as business data actions. In one embodiment, a business data action is performed on report elements such as a free cell, a table, a table cell, a map, a chart, and a chart section.

Turning back to FIG. 2, at block 220, the modification of the element of the report document is classified. In one embodiment, the classification is performed by receiving a unique identifier of the modified element in the report document, matching the unique identifier with the user action for modification of the report element, and identifying a class based on the unique identifier and the user interaction for modification.

In one embodiment, a unique identifier (ID) is generated for each cell in a report document. This unique ID identifies the cell value together with the structural coordinates of the table that determines this value. Such unique ID identifies precisely the content (value) of the cell and the path to it (structural coordinates). Whatever the user interaction for modification is (e.g. refresh, filter, sort, etc), the unique ID will point to the same value if the value still exists. In one embodiment, the unique ID consists of report ID, report element ID, and complete path to the value. The complete path to the value may be defined, for example, by data provider object identifiers and their values.

Referring again to FIG. 2, at block 230, a visual effect based on the classified modification of the report element is identified. In one embodiment, a visual effect is automatically selected from a set of predefined visual effects. Such visual effects may be motions such as flying away or flying in, fading effects, and the like. Thus the user is given the opportunity to track the changes being performed to the elements of the report document. In one embodiment, the automatic selection of the visual effect is performed by following a rule set. In one embodiment, the rule set may be arranged as a table. In one embodiment, the table may be one such as the exemplary table presented in FIG. 4. When a class 430 is defined for the modification, a certain visual effect 440 is selected.

The method further continues at block 240 by updating the report document by applying the identified visual effect together with the modification of the at least one report element. Thus, a user is able to track the changes in the report document by visualizing the exact elements being changed.

In one embodiment the modifications to the report document are recorded so that they may be reproduced at a later stage. The reproduction may also include the visual effects identified based on the modifications.

Figure 3:
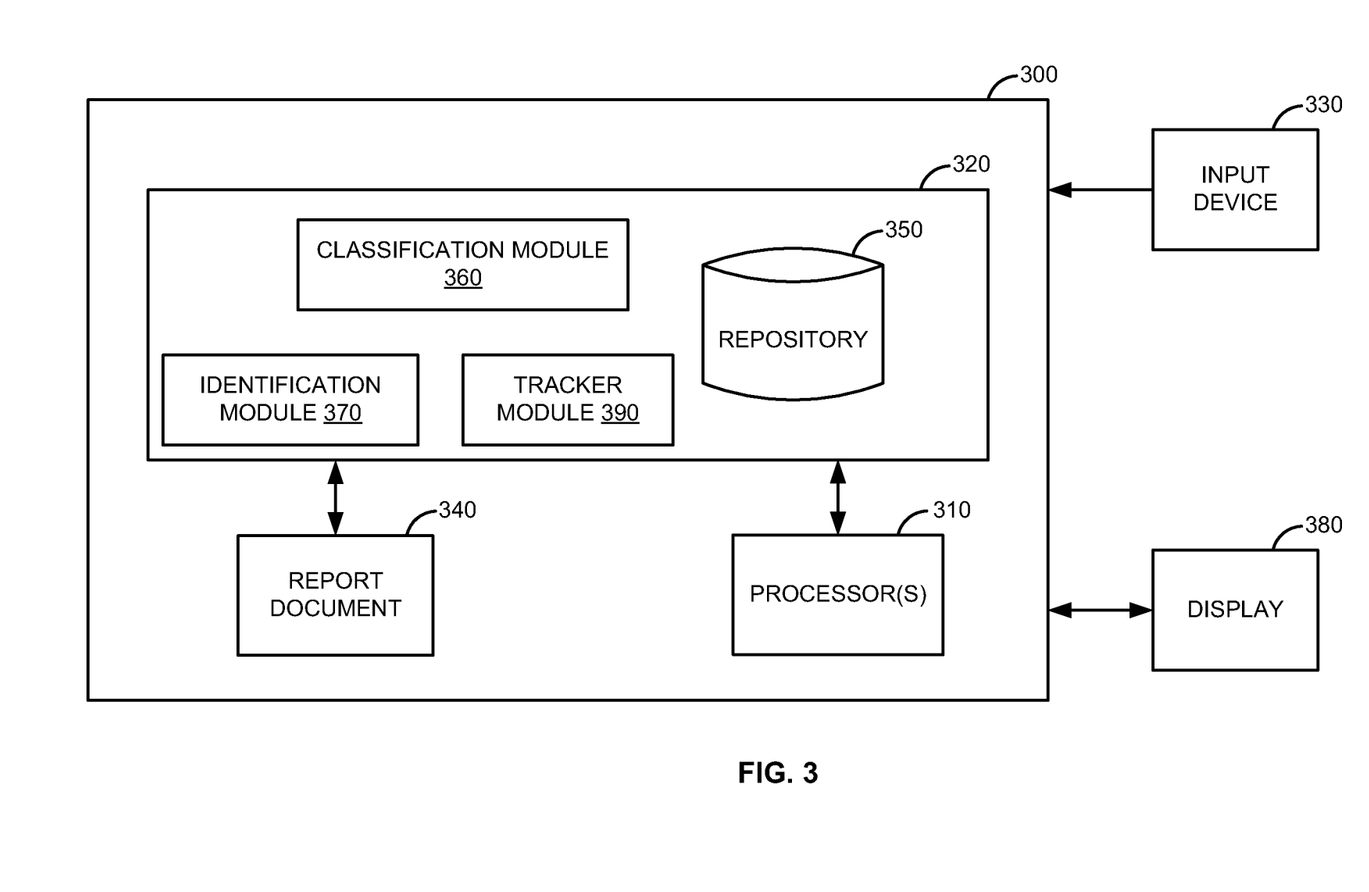
FIG. 3 is a block diagram of an embodiment of a system for visual tracking of report changes.

FIG. 3 is a block diagram of an embodiment of a system 300 for visual tracking of report changes. The system includes one or more processors 310 for executing program code. Computer memory 320 is in connection to the one or more processors 310. The system 300 further includes a repository 350 within the memory 320 to persist a database. In one embodiment the database consists of predefined visual effects.

A report document 340 is in communication with the memory 320 and consists of BI data. An input device 330 is connected to the system 300. The input device 330 is intended to receive user interaction for modification of elements in the report document 340. In one embodiment, the input device 330 is a pointing input device. In yet another embodiment, the pointing input device is a mouse, a touch pad or a touch screen. In one embodiment, the input device 330 is a keyboard or a touch screen display providing opportunity for typing.

The memory 320 also includes a classification module 360 and an identification module 370. The classification module is intended to classify the modification of the elements, the modification received by the input device 330. In one embodiment, the classification module 360 receives a unique identifier of each report element being modified and matches the unique identifier with the user interaction for modification of the report element. Then, the classification module 360 identifies a class based on the unique identifier and the user interaction for modification.

The identification module 370 is intended to identify a visual effect based on the classified modification of the report elements. In one embodiment, the identification module 370 is operable to automatically select the visual effect from a set of predefined visual effects. In one embodiment the set of predefined visual effects are persisted in the repository 350. In yet another embodiment, the identification module 370 selects a visual effect from a set of predefined visual effects by following a rule set.

The system 300 further includes a display 380 to show updates on the report document 340 by applying the identified visual effect together with the modification of the report elements.

In one embodiment, a tracker module 390 is also present in the memory 320, the tracker module intended to record the modifications to the report document 340 so that the recorded modifications to be available for reproducing on the display 380.

Figure 4:
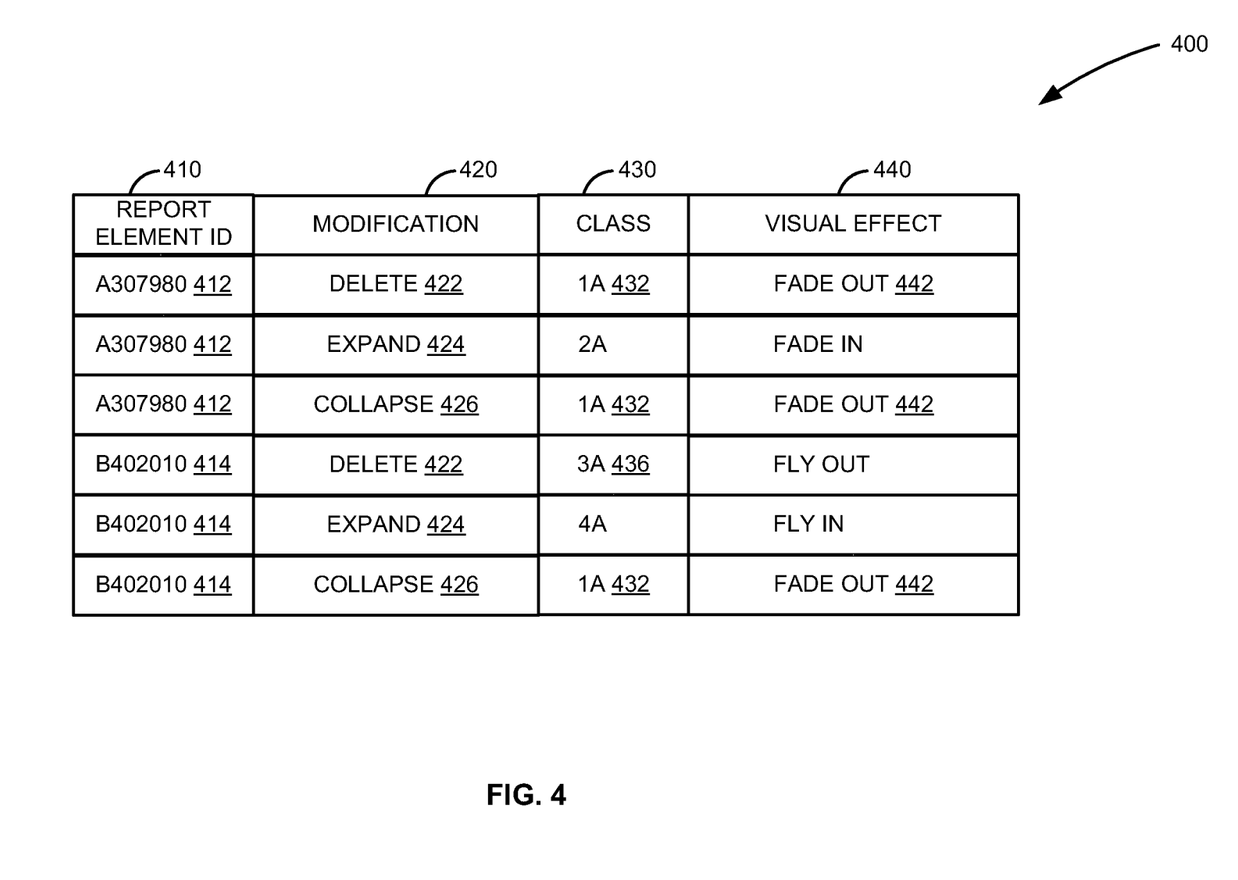
FIG. 4 illustrates an exemplary rule set arranged as a table to be used in identifying a visual effect, according to an embodiment for visual tracking of report changes.

FIG. 4 illustrates an exemplary rule set arranged as a table to be used in identifying a visual effect, according to one embodiment. The rule set table 400 includes columns 410, 420, 430, and 440. A report element ID 410 is a unique identification of an element in the report document. Depending on the modification 420 performed on each report element, a class 430 is identified. The class 430 depends on the report element ID 410 and the type of modification 420. The visual effect 440 is selected based on the class 430.

For example, for a report element being modified, a report element ID 410 is received, such as report element ID 412. For this report element, the modifications delete 422, expand 424, and collapse 426 are allowed. The combination of report element ID 410, and a modification 420, defines a class 430. It is possible to make different modifications to one report element and to define the same or different class. For example the modification delete 422 and collapse 426 for the report element having ID 412 is in both cases class 1A 432. The modifications delete 422 and collapse 426 for report element having ID 414 are different being 3A 436 and 1A 432 correspondingly.

By having a class 430 identified, a visual effect 440 is also identified following the table 400. In an embodiment as presented in FIG. 4, each type of class 430 corresponds to exact type of visual effect 440. For example, class 1A 432 corresponds always to the fade out effect 442. In one embodiment, the data in the rule set table 400 is customizable according to the BI needs.

Figure 5:
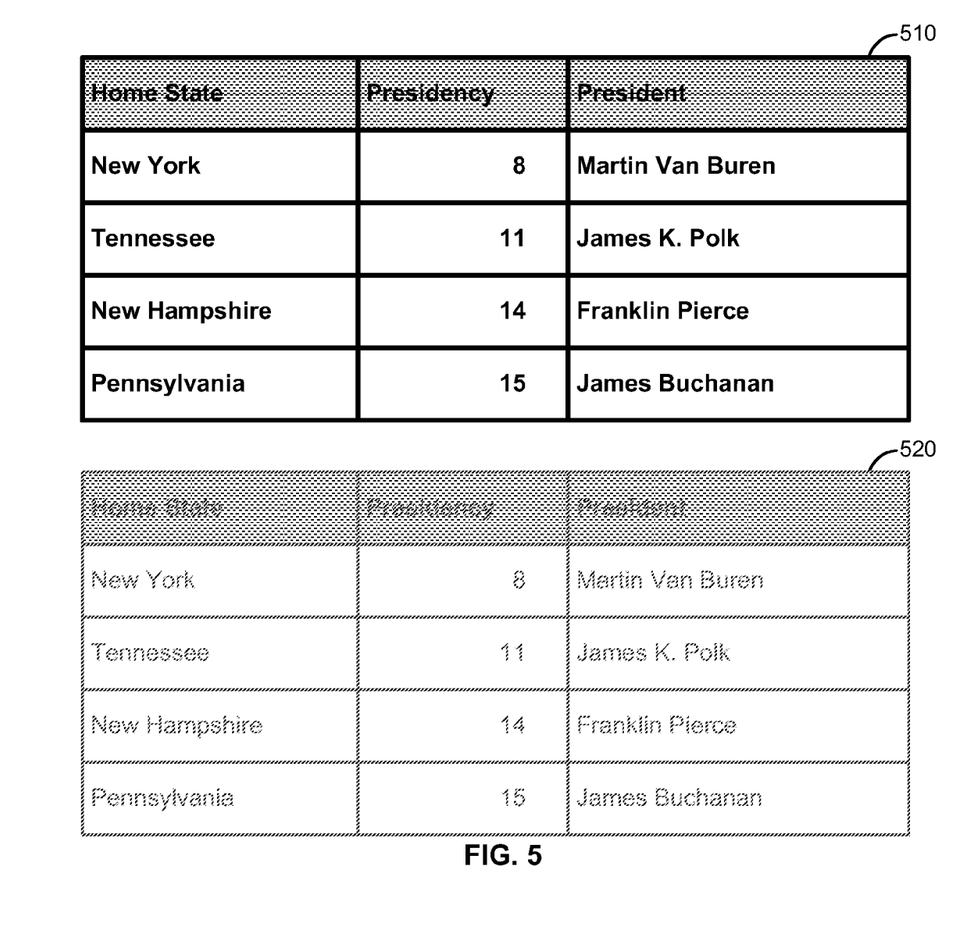
FIG. 5 is an exemplary diagram illustrating a fade out/fade in effect according to one embodiment.

FIG. 5 is an exemplary diagram illustrating a fade out/fade in effect according to one embodiment. A fade out effect is typically used for report elements that are about to disappear in the next state of the report. For example, the data presented in screenshot 510 is about to be removed in the next state of the report document. The user action for such interaction to the report elements may be, for example, collapsing, deleting, new data query where the result data will substitute the current data, etc. Then, if the identified visual effect is, for example, a fade out effect, the data presented in screenshot 510 fades out till the data is completely faded out meaning the data is not visible any more. The transition state such as the state shown in screenshot 520 gives the user opportunity to track what data is going to be removed according to the user interaction performed. Typically there are several transitions states and each transition state is more faded than the previous one, which is used for tracking report elements that are going to be removed.

The opposite effect may be used for data that is going to appear in a newer state of the report. In such case data that is initially invisible, appears as faded data as presented in screenshot 520 and then eventually becomes at the state given in screenshot 510. This effect is known as fade in effect.

Some embodiments of the invention may include other techniques for visual tracking of modified report data such as adjusting font size, font thickness, brightness, color, and contrast of the modified report data. In one embodiment, decreasing the font size or the font thickness gradually till disappearance of the modified data is used for tracking report data that is removed. Gradually increasing the font size or the font thickness is used for novel data appearing in a report. In another embodiment, a visual effect for appearance or disappearance of modified report data is achieved by adjusting hue, saturation, or brightness of the color of the modified report data.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 6:
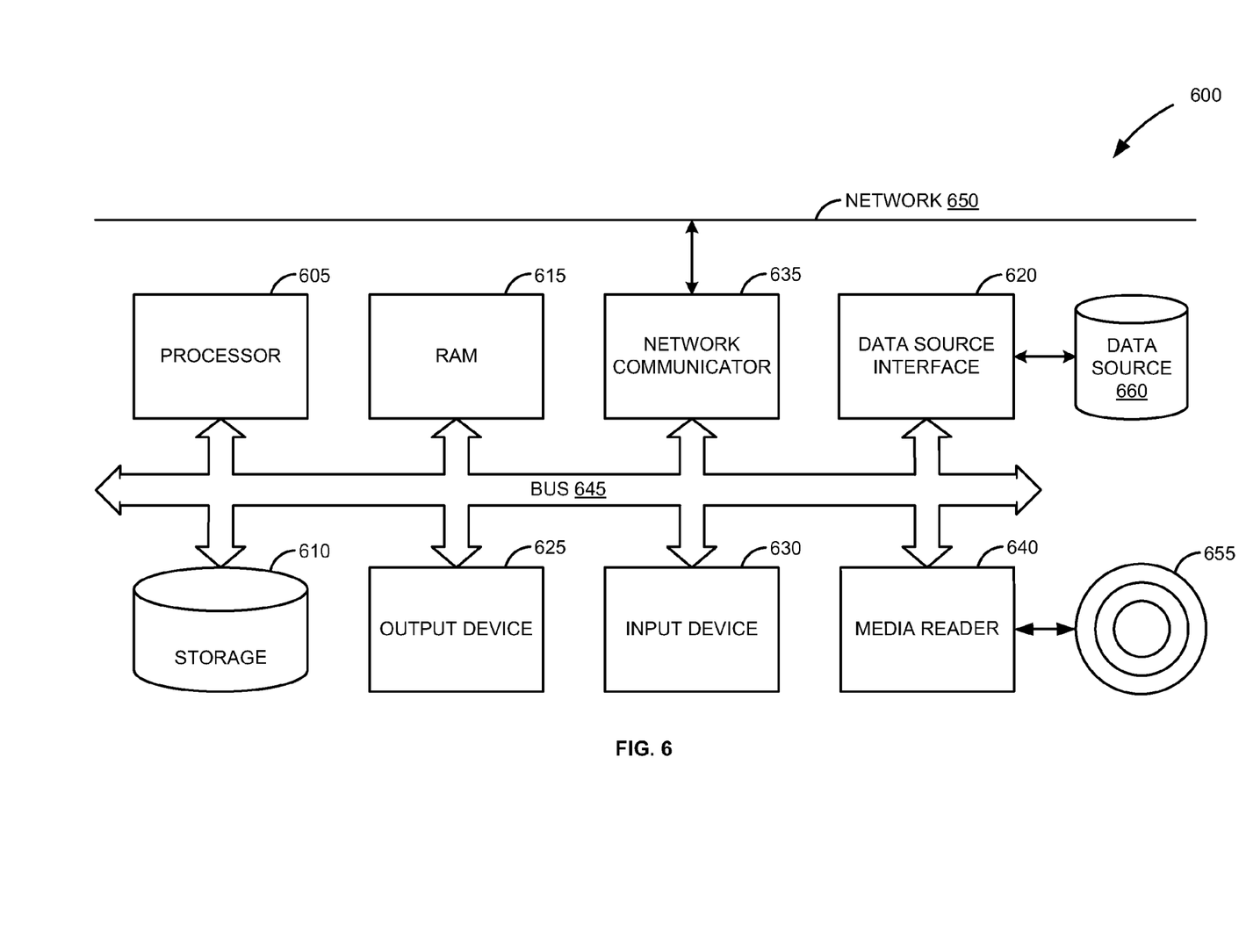
FIG. 6 is a block diagram illustrating a computing environment in which the techniques described for visual tracking of report changes can be implemented, according to an embodiment.

FIG. 6 is a block diagram of an exemplary computer system 600. The computer system 600 includes a processor 605 that executes software instructions or code stored on a computer readable storage medium 655 to perform the above-illustrated methods of the invention. The computer system 600 includes a media reader 640 to read the instructions from the computer readable storage medium 655 and store the instructions in storage 610 or in random access memory (RAM) 615. The storage 610 provides a large space for keeping static data where at least some instructions could be stored for later execution. The stored instructions may be further compiled to generate other representations of the instructions and dynamically stored in the RAM 615. The processor 605 reads instructions from the RAM 615 and performs actions as instructed. According to one embodiment of the invention, the computer system 600 further includes an output device 625 (e.g., a display) to provide at least some of the results of the execution as output including, but not limited to, visual information to users and an input device 630 to provide a user or another device with means for entering data and/or otherwise interact with the computer system 600. Each of these output devices 625 and input devices 630 could be joined by one or more additional peripherals to further expand the capabilities of the computer system 600. A network communicator 635 may be provided to connect the computer system 600 to a network 650 and in turn to other devices connected to the network 650 including other clients, servers, data stores, and interfaces, for instance. The modules of the computer system 600 are interconnected via a bus 645. Computer system 600 includes a data source interface 620 to access data source 660. The data source 660 can be accessed via one or more abstraction layers implemented in hardware or software. For example, the data source 660 may be accessed by network 650. In some embodiments the data source 660 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Data-Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. A computer implemented method for dynamic report generation comprising:
   in a user interface presenting a report document, receiving a user interaction for modification of at least one report element in the report document;
   classifying the modification of the at least one report element by:
      receiving a unique identifier of the at least one report element;
      matching the unique identifier with the user interaction for modification of the at least one report element; and
      identifying a class based on the unique identifier and the user interaction for modification;
   identifying a visual effect based on the classified modification of the at least one report element; and
   updating the report document by applying the identified visual effect together with the modification of the at least one report element.

2. The method of claim 1, wherein the at least one report element is selected from the group consisting of free cell, table, table cell, map, chart, and chart section.

3. The method of claim 1, wherein identifying the visual effect based on the classified modification of the at least one report element further comprises automatically selecting the visual effect from a set of predefined visual effects.

4. The method of claim 3, wherein automatically selecting the visual effect from the set of predefined visual effects further comprises selecting the visual effect by following a rule set.

5. The method of claim 1, further comprising recording the modification of the at least one report element in the report document.

6. The method of claim 5, further comprising reproducing the recorded modification of the at least one report element in the report document.

7. A computer system for dynamic report generation including at least one processor for executing program code and memory, the system comprising:
   a report document;
   an input device to receive user interaction for modification of at least one report element in the report document;
   a classification module to classify the modification of the at least one report element, wherein the classification module is further operable to:
      receive a unique identifier of the at least one report element;
      match the unique identifier with the user interaction for modification of the at least one report element; and
      identify a class based on the unique identifier and the user interaction for modification;
   an identification module to identify a visual effect based on the classified modification of the at least one report element; and
   a display to show updates on the report document by applying the identified visual effect together with the modification of the at least one report element.

8. The system of claim 7, further comprising a repository within the memory to persist a set of predefined visual effects.

9. The system of claim 8, wherein the identification module is further operable to automatically select the visual effect from the set of predefined visual effects.

10. The system of claim 9, wherein the identification module follows a rule set to select the visual effect from the set of predefined visual effects.

11. The system of claim 7, further comprising a tracker module to record the modification of the at least one report element in the report document.

12. An article of manufacture including a non-transitory computer readable storage medium to tangibly store instructions, which when executed by a computer, cause the computer to:
   receive a user interaction for modification of at least one report element in a report document, the report document presented in a user interface;
   classify the modification of the at least one report element, wherein the instructions to classify the modification of the at least one report elements further comprise instructions, which when executed by a computer, cause the computer to:
      receive a unique identifier of the at least one report element;
      match the unique identifier with the user interaction for modification of the at least one report element; and
      identify a class based on the unique identifier and the user interaction for modification;
   identify a visual effect based on the classified modification of the at least one report element; and
   update the report document by applying the identified visual effect together with the modification of the at least one report element.

13. The article of manufacture of claim 12, wherein the at least one report element is selected from the group consisting of free cell, table, table cell, map, chart, and chart section.

14. The article of manufacture of claim 12, wherein the instructions to identify the visual effect based on the classified modification of the at least one report element further comprise instructions, which when executed by a computer, cause the computer to automatically select the visual effect from a set of predefined visual effects.

15. The article of manufacture of claim 14, wherein the instructions to automatically select the visual effect from the set of predefined visual effects further comprise instructions, which when executed by a computer, cause the computer to select the visual effect by following a rule set.

16. The article of manufacture of claim 12, further comprising instructions, which when executed by a computer, cause the computer to record the modification of the at least one report element in the report document.

17. The article of manufacture of claim 16, further comprising instructions, which when executed by a computer, cause the computer to reproduce the recorded modification of the at least one report element in the report document.

* * * * *